US011679785B2

(12) United States Patent
Inoue et al.

(10) Patent No.: US 11,679,785 B2
(45) Date of Patent: Jun. 20, 2023

(54) VEHICLE CONTROL DEVICE

(71) Applicant: TOYOTA JIDOSHA KABUSHIKI KAISHA, Aichi-ken (JP)

(72) Inventors: Teiko Inoue, Toyota (JP); Mitsuyoshi Ohno, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 135 days.

(21) Appl. No.: 17/341,382

(22) Filed: Jun. 8, 2021

(65) Prior Publication Data

US 2022/0081008 A1 Mar. 17, 2022

(30) Foreign Application Priority Data

Sep. 14, 2020 (JP) .............................. JP2020-154029

(51) Int. Cl.
*B60W 60/00* (2020.01)
*B60W 10/30* (2006.01)
*B60W 40/08* (2012.01)

(52) U.S. Cl.
CPC ........ *B60W 60/0053* (2020.02); *B60W 10/30* (2013.01); *B60W 40/08* (2013.01); *B60W 2540/229* (2020.02)

(58) Field of Classification Search
CPC ...... B60W 60/00; B60W 10/00; B60W 40/00; B60W 2540/00
See application file for complete search history.

(56) References Cited

U.S. PATENT DOCUMENTS

| 9,690,292 | B1* | 6/2017 | Chan .................... G06V 10/751 |
| 9,928,433 | B1* | 3/2018 | Chan .................... H04N 5/247 |
| 10,407,079 | B1* | 9/2019 | Chan .................... G06V 10/34 |
| 10,589,685 | B1* | 3/2020 | Talavera ............... A45D 42/16 |
| 10,647,333 | B1* | 5/2020 | Donnelly ............... B60K 35/00 |
| 10,891,502 | B1* | 1/2021 | Chan .................... B60K 28/066 |
| 10,943,136 | B1* | 3/2021 | Chan .................... G06T 7/73 |
| 2018/0281967 | A1* | 10/2018 | Stephens ........... B64D 11/0636 |
| 2018/0290660 | A1* | 10/2018 | Huang ................. B60W 40/08 |
| 2019/0054863 | A1* | 2/2019 | Roth ................... B60R 16/0373 |
| 2019/0225156 | A1 | 7/2019 | Sasaki et al. |
| 2020/0290630 | A1* | 9/2020 | Elwart ............. B60W 50/0098 |
| 2020/0346658 | A1* | 11/2020 | Deng .................. G06V 40/107 |
| 2021/0403022 | A1* | 12/2021 | Hong .................... G06V 40/20 |
| 2021/0403051 | A1* | 12/2021 | Jaegal .................. B60W 40/02 |

FOREIGN PATENT DOCUMENTS

| JP | 201836722 A | 3/2018 |
| JP | 201948600 A | 3/2019 |
| JP | 2019127154 A | 8/2019 |

* cited by examiner

*Primary Examiner* — Aniss Chad
*Assistant Examiner* — Elizabeth J Slowik
(74) *Attorney, Agent, or Firm* — Hauptman Ham, LLP

(57) ABSTRACT

In a vehicle in which a driving state is switchable between autonomous driving and manual driving, it is determined whether an occupant is applying makeup. When it is determined that the occupant is applying makeup at a time of switching of the driving state from autonomous driving to manual driving, a process of closing a lid of a mirror provided on a sun visor of the vehicle is performed as a makeup ending process of ending makeup by the occupant.

5 Claims, 15 Drawing Sheets

VEHICLE CONTROL DEVICE

CROSS-REFERENCE TO RELATED APPLICATION

This application claims priority to Japanese Patent Application No. 2020-154029 filed on Sep. 14, 2020, incorporated herein by reference in its entirety.

BACKGROUND

1. Technical Field

The present disclosure relates to a vehicle control device.

2. Description of Related Art

According to Japanese Unexamined Patent Application Publication No. 2018-036722 (JP 2018-036722 A), the possibility of continuing autonomous driving is predicted during the autonomous driving. When it is predicted and determined that the possibility of continuing the autonomous driving is low, the control target value of risk potential, which is the control target in autonomous driving, is switched and set to a close driving target value so as to control the vehicle motion of the own vehicle. Thereby, it is possible to appropriately notify the occupants of a state in which it is difficult to continue the autonomous driving and provide a prediction of switching (handover) to manual driving.

SUMMARY

When the occupant seated in the driver's seat of a vehicle (hereinafter referred to simply as an occupant) is applying makeup using a mirror of a sun visor or the like during autonomous driving, the occupant may get caught up in makeup to continue the makeup even if a handover notification is given. In this case, the occupant is not recognized as being ready for manual driving, so the control for stopping the traveling of the vehicle may have to be executed.

The present disclosure has been made in consideration of the above facts, and an object of the present disclosure is to obtain a vehicle control device capable of suppressing the continuation of makeup by an occupant when the driving state is switched from autonomous driving to manual driving.

A vehicle control device according to a first aspect includes a processing unit that performs a makeup ending process of ending makeup by an occupant at a time of switching of a driving state from autonomous driving to manual driving in a vehicle in which the driving state is switchable between autonomous driving and manual driving.

In the first aspect, the makeup ending process of ending the makeup by the occupant is performed at the time of switching of the driving state from autonomous driving to manual driving. Therefore, it is possible to suppress the occupant from continuing the makeup.

According to a second aspect, the first aspect further includes a determination unit that determines whether the occupant is applying makeup in the vehicle in which the driving state is switchable between the autonomous driving and the manual driving, wherein the processing unit performs the makeup ending process when the determination unit determines that the occupant is applying makeup at the time of switching of the driving state from the autonomous driving to the manual driving.

According to the second aspect, it is possible to suppress the makeup ending process from being unnecessarily performed when the occupant is not applying makeup.

According to a third aspect, in the first or second aspect, the processing unit performs a process of closing a lid of a mirror provided on a sun visor of the vehicle as the makeup ending process.

According to the third aspect, it is possible to inhibit the occupant from continuing the makeup using the mirror provided on the sun visor of the vehicle.

According to a fourth aspect, in the first or second aspect, the processing unit performs a process of erasing a mirror image displayed on a mirror provided on a sun visor of the vehicle or a windshield glass of the vehicle as the makeup ending process.

According to the fourth aspect, it is possible to inhibit the occupant from continuing the makeup by looking at the mirror image displayed on the mirror provided on the sun visor of the vehicle or the windshield glass of the vehicle.

According to a fifth aspect, in the first or second aspect, the processing unit performs a process of returning a sun visor pulled from a normal position toward a rear of the vehicle and used by the occupant to the normal position, or a process of returning the sun visor moved from a storage position and used by the occupant to the storage position, as the makeup ending process.

According to the fifth aspect, it is possible to inhibit the occupant from continuing the makeup using the sun visor pulled from the normal position toward the rear of the vehicle or the sun visor moved from the storage position.

According to a sixth aspect, the first or second aspect further includes a prohibition unit that prohibits opening and closing of a lid of a mirror provided on a sun visor of the vehicle or display of a mirror image on the mirror provided on the sun visor of the vehicle or a windshield glass of the vehicle, when the driving state of the vehicle is the manual driving.

According to the sixth aspect, it is possible to suppress the occupant from applying makeup until the driving state is switched to autonomous driving.

The present disclosure has an effect of suppressing the occupant from continuing makeup when the driving state is switched from autonomous driving to manual driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an example of an embodiment of the present disclosure will be described in detail with reference to the drawings.

First Embodiment

Figure 1:
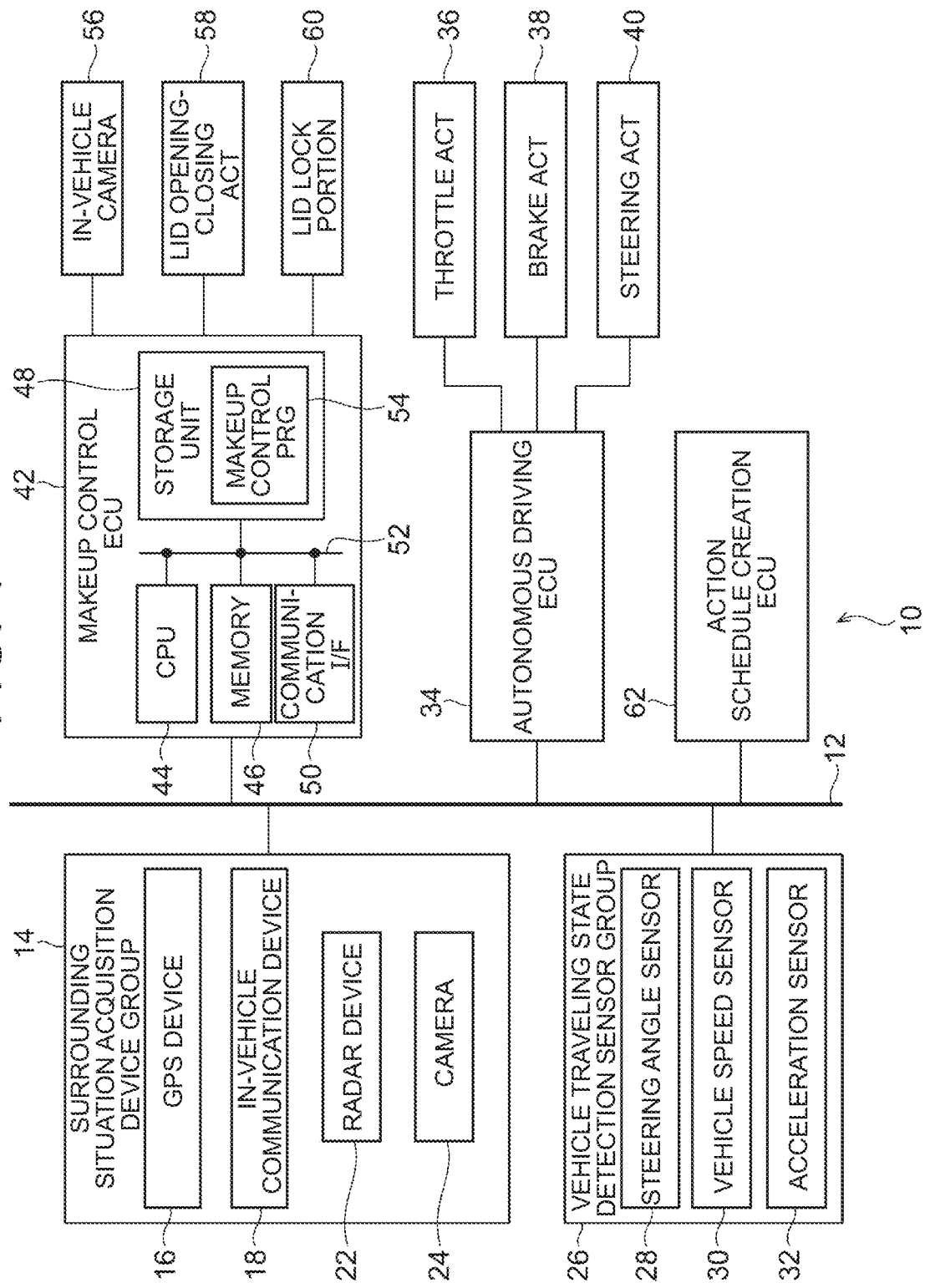
FIG. 1 is a block diagram showing a schematic configuration of an in-vehicle system according to a first embodiment.

An in-vehicle system 10 shown in FIG. 1 includes a communication bus 12. To the communication bus 12, a surrounding situation acquisition device group 14, a vehicle traveling state detection sensor group 26, an autonomous driving electronic control unit (ECU) 34, an action schedule creation ECU 62, and a makeup control ECU 42 are connected. Note that FIG. 1 shows only a part of the in-vehicle system 10. Further, in the following, a vehicle equipped with the in-vehicle system 10 will be referred to as an own vehicle. As will be described later, the own vehicle can be switched between autonomous driving and manual driving.

The surrounding situation acquisition device group 14 includes a Global Positioning System (GPS) device 16, an in-vehicle communication device 18, a radar device 22, a camera 24, and the like as devices for acquiring information indicating the situation of the surrounding environment of the own vehicle.

The GPS device 16 receives GPS signals from a plurality of GPS satellites to determine the position of the own vehicle. The positioning accuracy of the GPS device 16 improves as the number of receivable GPS signals increases. The in-vehicle communication device 18 is a communication device that performs at least one of vehicle-to-vehicle communication with other vehicles and road-to-vehicle communication with roadside devices.

The radar device 22 includes a plurality of radar devices having different detection ranges, detects objects such as pedestrians and other vehicles around the own vehicle as point group information, and acquires the relative positions and the relative speeds between the detected objects and the own vehicle. Further, the radar device 22 has a built-in processing device that processes the detection result of the surrounding objects. The processing device excludes noises, roadside objects such as guardrails, and the like from the monitoring target based on changes in the relative position and the relative speed with respect to each object included in the latest multiple detection results, and follows and monitors specific objects such as pedestrians and other vehicles as monitoring target objects. Then, the radar device 22 outputs information of the relative position, the relative speed, and the like with respect to each object to be monitored. The camera 24 images the surroundings of the own vehicle with a plurality of cameras and outputs the captured images.

Further, the vehicle traveling state detection sensor group 26 includes a steering angle sensor 28 for detecting the steering angle of the own vehicle, a vehicle speed sensor 30 for detecting the traveling speed of the own vehicle, and an acceleration sensor 32 for detecting the acceleration applied to the own vehicle, as a plurality of sensors for acquiring the traveling state of the vehicle.

The autonomous driving ECU 34 is connected to a throttle actuator (ACT) 36 that changes the throttle opening of the own vehicle and a brake ACT 38 that changes the braking force generated by the braking device of the own vehicle. Further, the autonomous driving ECU 34 is connected to a steering ACT 40 that changes the steering amount by the steering device of the own vehicle.

The autonomous driving ECU 34 includes a central processing unit (CPU), a memory such as a read only memory (ROM) and a random access memory (RAM), a non-volatile storage unit such as a hard disk drive (HDD) and a solid state drive (SSD), a communication interface (I/F), and the like. Autonomous driving software is stored in the storage unit. In the autonomous driving ECU 34, the CPU executes the autonomous driving software, so that when the autonomous driving mode is selected, an autonomous driving process of causing the own vehicle to travel autonomously without driving operation by the occupant of the own vehicle is performed. The autonomous driving process is a process of determining the situation of the own vehicle and its surrounding situation based on the information obtained from the surrounding situation acquisition device group 14 and the vehicle traveling state detection sensor group 26, and controlling the throttle ACT 36, the brake ACT 38, and the steering ACT 40.

In the autonomous driving of the embodiment, as described above, the own vehicle travels autonomously without the driving operation by the occupant of the own vehicle. On the other hand, the manual driving in the embodiment includes a case where the autonomous driving ECU 34 performs a part of the driving operation and the occupant of the own vehicle performs the remaining part. As an example, in the manual driving mode, the speed adjustment is executed by the autonomous driving ECU 34, and only the steering operation is performed by the occupant of the own vehicle.

The action schedule creation ECU 62 includes a CPU, a memory such as a ROM and a RAM, a non-volatile storage unit such as an HDD and an SSD, and a communication I/F, and the storage unit stores map information. When the destination of the own vehicle is set, the action schedule creation ECU 62 collates the current position of the own vehicle and the position of the destination of the own vehicle that are obtained from the GPS device 16 with the map information, and searches for a route to the destination.

In addition, the action schedule creation ECU 62 subdivides the searched route (action plan in the own vehicle) into action schedules such as turning left or right, changing lanes, and merging, and determines whether to carry out the scheduled action by autonomous driving or manual driving for each subdivided action schedule. In the present embodiment, the scheduled action is basically carried out through the autonomous driving by the autonomous driving ECU 34. However, when it is difficult to perform the autonomous driving, for example, when the scheduled action is "merging" and the merging road is short, it is determined that the action is carried out by manual driving.

Each action schedule included in the action plan includes information indicating the scheduled action such as turning left or right and changing lanes, information indicating whether the action is carried out by autonomous driving or manual driving, and information indicating a place where the action is scheduled to be carried out (for example, latitude and longitude). The action plan created by the action schedule creation ECU 62 is transmitted to the autonomous driving ECU 34 and the makeup control ECU 42.

Figure 10:
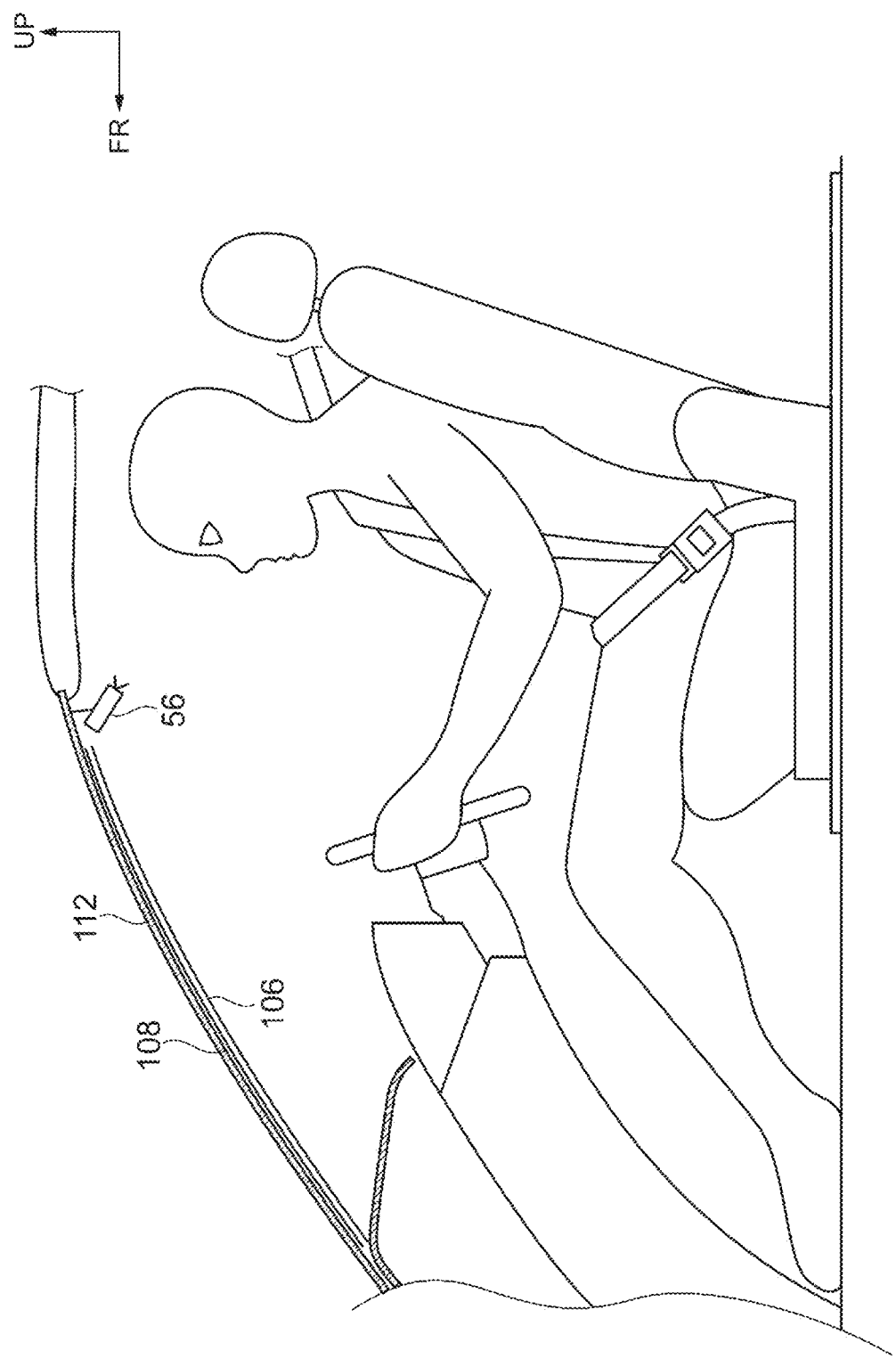
FIG. 10 is a schematic diagram showing an arrangement of an image display film and the like in the fourth embodiment.

The makeup control ECU 42 includes a CPU 44, a memory 46 such as a ROM and a RAM, a non-volatile storage unit 48 such as an HDD and an SSD, and a communication I/F 50. The CPU 44, the memory 46, the storage unit 48, and the communication I/F 50 are connected to each other so as to be able to communicate with each other via an internal bus 52. The makeup control ECU 42 is connected to an in-vehicle camera 56, a lid opening-closing ACT 58, and a lid lock portion 60. The in-vehicle camera 56 is provided in the vehicle cabin of the own vehicle (an example of the installation position is shown in FIG. 10), and images the inside of the vehicle cabin of the own vehicle including the occupant.

Figure 2:
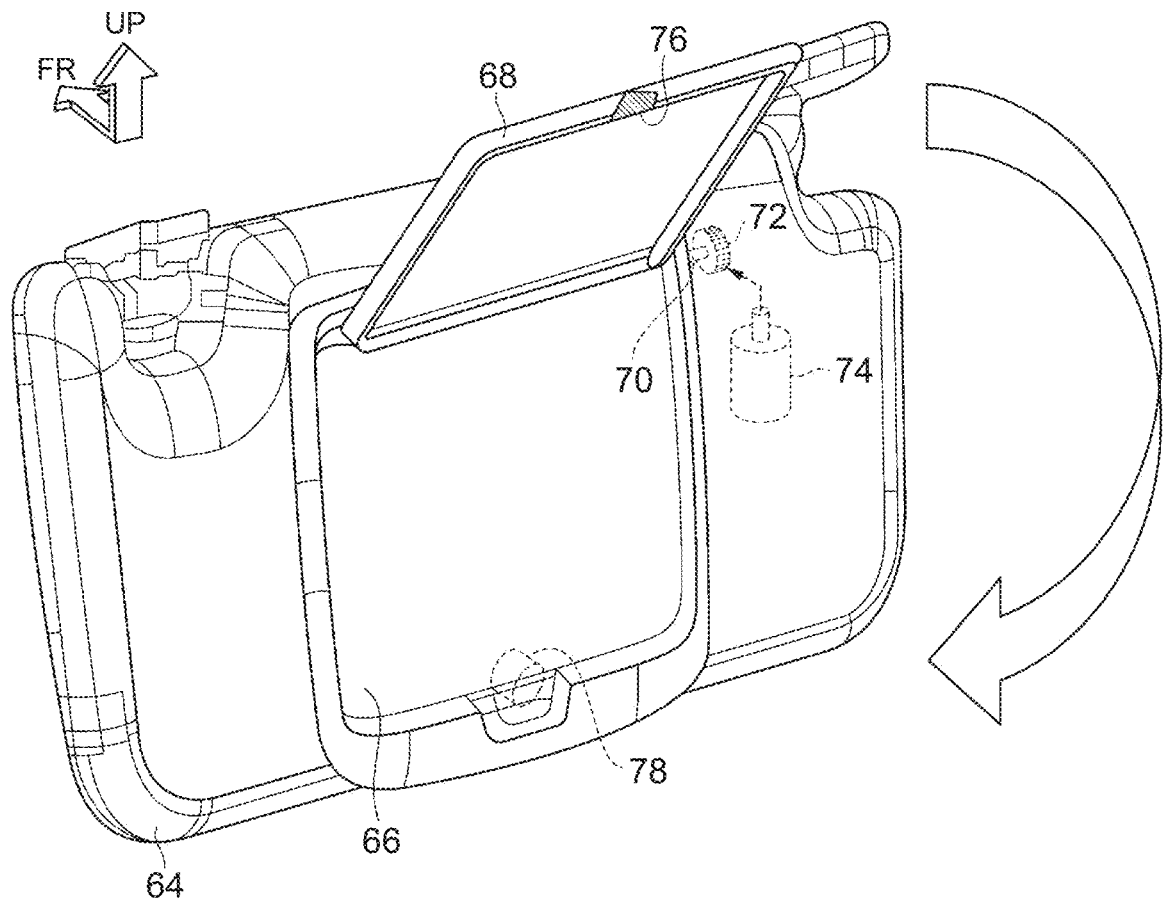
FIG. 2 is a perspective view showing a sun visor according to the first embodiment.

As shown in FIG. 2, a sun visor 64 of the own vehicle is provided with a mirror (optical mirror) 66 and a lid 68 that opens and closes the mirror 66 by being pivoted around a shaft 70. The lid opening-closing ACT 58 includes a gear 72 attached to the shaft 70 of the lid 68, and a motor 74 that rotates the gear 72 with a generated driving force via a reduction mechanism (not shown). The lid 68 is opened and closed by the driving force of the motor 74. The operation of the lid opening-closing ACT 58 is controlled by the makeup control ECU 42.

Further, the lid lock portion 60 includes a metal member 76 provided on the opposite side of the lid 68 from the shaft 70, and an electromagnet 78 disposed at a position facing the metal member 76 when the lid 68 is closed. In the lid lock portion 60, the metal member 76 is attracted by the electromagnet 78 with the lid 68 being closed, which prohibits the lid 68 from opening (the mirror 66 from being exposed) and locks the lid 68 with the lid 68 being closed. The operation of the lid lock portion 60 is controlled by the makeup control ECU 42.

Figure 3:
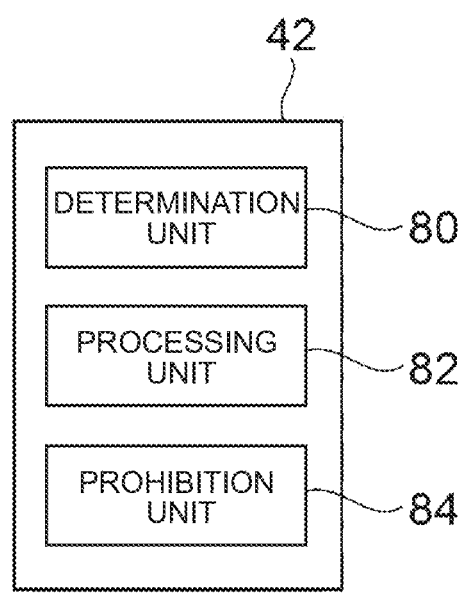
FIG. 3 is a functional block diagram of a makeup control electronic control unit (ECU)

Further, a makeup control program 54 is stored in the storage unit 48 of the makeup control ECU 42. In the makeup control ECU 42, the makeup control program 54 is read from the storage unit 48 and expanded into the memory 46, and the CPU 44 executes the makeup control program 54 expanded in the memory 46, thereby performing the makeup control process described later. The makeup control ECU 42 functions as a determination unit 80, a processing unit 82, and a prohibition unit 84 shown in FIG. 3 by performing the makeup control process.

The determination unit 80 determines whether the occupant seated in the driver's seat of the own vehicle is applying makeup when the driving state of the own vehicle is autonomous driving. Further, the processing unit 82 performs a makeup ending process of ending the makeup by the occupant at the time of switching of the driving state of the own vehicle from autonomous driving to manual driving. Further, the prohibition unit 84 prohibits opening and closing of the lid 68 of the mirror 66 provided on the sun visor 64 of the own vehicle or prohibits display of a mirror image on the mirror 66 provided on the sun visor 64 of the own vehicle or a windshield glass 112 (described later) of the own vehicle, when the driving state of the own vehicle is manual driving.

Figure 4:
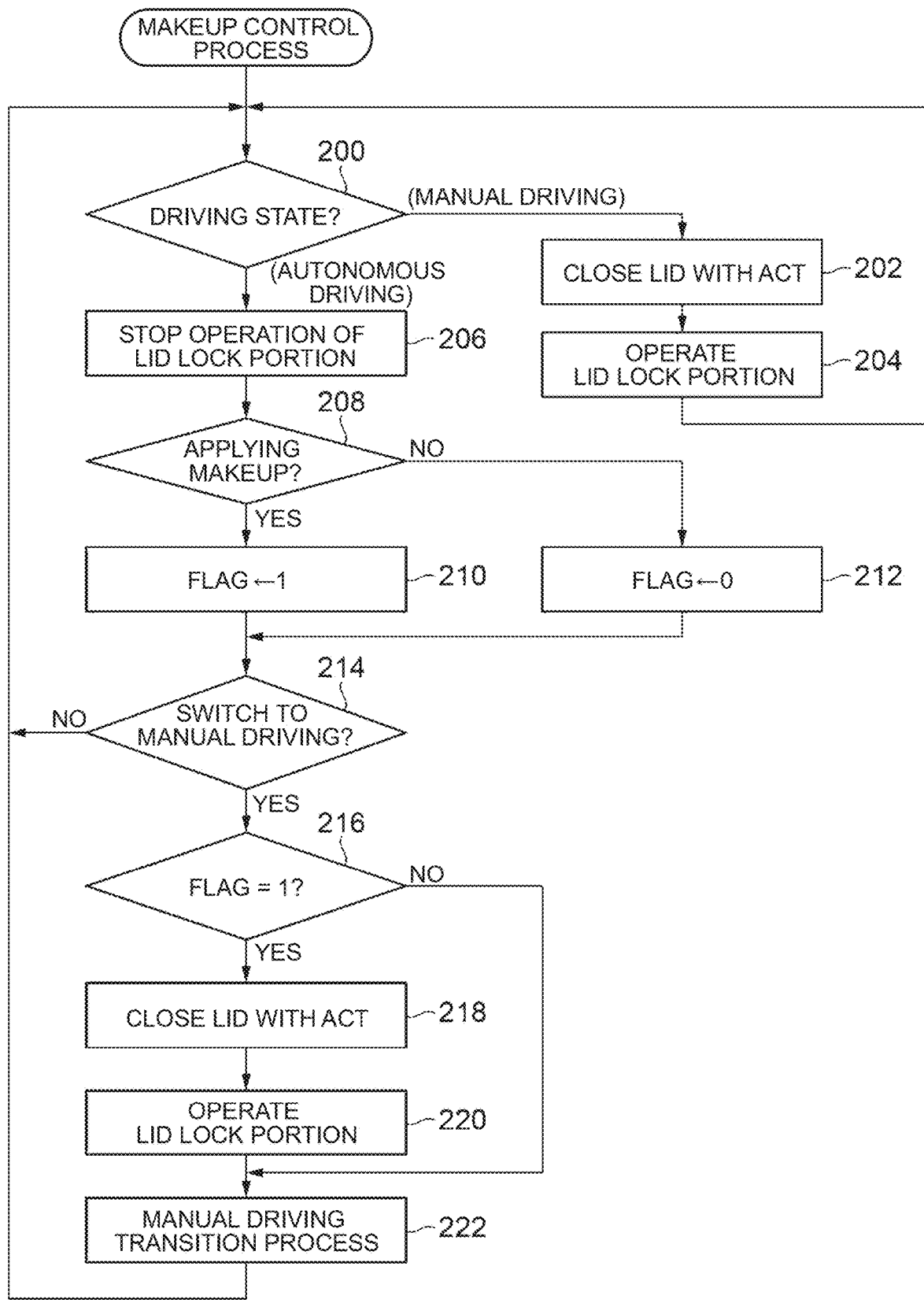
FIG. 4 is a flowchart showing an example of a makeup control process according to the first embodiment.

Next, as the operations of the first embodiment, the makeup control process executed by the makeup control ECU 42 while the ignition of the own vehicle is on will be described with reference to FIG. 4.

In step 200 of the makeup control process, the processing unit 82 determines whether the driving state of the own vehicle is autonomous driving or manual driving. When the driving state of the own vehicle is manual driving, the process proceeds from step 200 to step 202.

In step 202, the prohibition unit 84 closes the lid 68 with the lid opening-closing ACT 58. Further, in step 204, the prohibition unit 84 operates the lid lock portion 60 to lock the lid 68 with the lid 68 being closed. When the process of step 204 is performed, the process returns to step 200. Thus, while the driving state of the own vehicle is manual driving, steps 200 to 204 are repeated so that the lid 68 is maintained to be closed and locked. Therefore, the occupant is prohibited from opening the lid 68 and applying makeup using the mirror 66 of the sun visor 64.

When the driving state of the own vehicle is autonomous driving, the process proceeds from step 200 to step 206. In step 206, the processing unit 82 stops the operation of the lid lock portion 60. Thus, when the driving state of the own vehicle is autonomous driving, the occupant can open the lid 68 and apply makeup using the mirror 66 of the sun visor 64.

In step 208, the determination unit 80 determines the movement of the occupant based on the image of the inside of the vehicle cabin of the own vehicle that is captured by the in-vehicle camera 56, and determines whether the occupant is applying makeup based on the determined movement. When the determination in step 208 is affirmative, the process proceeds to step 210, and in step 210, the determination unit 80 sets a flag to "1" that means that the occupant is applying makeup. When the determination in step 208 is negative, the process proceeds to step 212, and in step 212, the determination unit 80 sets a flag to "0" that means that the occupant is not applying makeup.

In step 214, the processing unit 82 determines whether the timing for switching the driving state from autonomous driving to manual driving has arrived. The determination in step 214 is configured such that a notification is received from the autonomous driving ECU 34 each time the driving state is switched, and can be realized by determining whether the switching of the driving state from autonomous driving to manual driving has been notified. Further, the determination in step 214 can also be realized by determining whether the own vehicle has reached the place where the driving state is switched from autonomous driving to manual driving based on the action plan notified from the action schedule creation ECU 62.

When the determination in step 214 is negative, the process returns to step 200, and steps 200 and steps 206 to 214 are repeated until the determination in step 214 becomes affirmative. Thus, the flag is set to 1 while the occupant is applying makeup, and the flag is set to 0 when the occupant finishes the makeup.

Further, when the timing for switching the driving state from autonomous driving to manual driving arrives, the determination in step 214 becomes affirmative and the process proceeds to step 216. At this time, the occupant is notified by voice or the like that the driving state is switched from autonomous driving to manual driving. In step 216, the processing unit 82 determines whether the flag is set to 1, that is, whether the occupant continues applying makeup.

When the determination in step 216 is affirmative, the process proceeds to step 218, and in step 218, the processing unit 82 closes the lid 68 with the lid opening-closing ACT 58. Note that step 218 is an example of the makeup ending process. Further, in step 220, the processing unit 82 operates the lid lock portion 60 to lock the lid 68 with the lid 68 being closed. When the process of step 220 is performed, the process proceeds to step 222. When the determination in step 216 is negative, the process skips steps 218, 220 and proceeds to step 222.

In this way, when the occupant continues applying makeup at the time of switching of the driving state of the own vehicle from autonomous driving to manual driving, the lid 68 is closed and locked, which inhibits the occupant from continuing the makeup using the mirror 66 of the sun visor 64. Thereby, recognition that the occupant is not ready for manual driving is suppressed, so that the switching of the driving state from autonomous driving to manual driving is smoothly performed.

Further, the determination of whether the occupant is applying makeup requires some time because it is necessary to determine the behavior of the occupant, but in the present embodiment, the determination of whether the occupant is applying makeup is performed during autonomous driving. Therefore, when the driving state of the own vehicle is switched from autonomous driving to manual driving, it is possible to immediately determine that the occupant is applying makeup and if necessary, immediately perform the process of closing and locking the lid 68.

In step 222, the autonomous driving ECU 34 performs a manual driving transition process of switching the driving state of the own vehicle from autonomous driving to manual driving. Then, when the process of step 222 is completed, the process returns to step 200.

As described above, in the first embodiment, the processing unit 82 performs the makeup ending process of ending makeup by the occupant when the driving state is switched from the autonomous driving to manual driving in the vehicle in which the driving state can be switched between autonomous driving and manual driving. Thus, it is possible to suppress the occupant from continuing makeup when the driving state is switched from autonomous driving to manual driving.

In the first embodiment, the determination unit 80 determines whether the occupant is applying makeup in the vehicle in which the driving state can be switched between autonomous driving and manual driving. Further, the processing unit 82 performs the makeup ending process when the determination unit 80 determines that the occupant is applying makeup at the time of switching of the driving state from autonomous driving to manual driving. Thereby, it is possible to suppress the makeup ending process from being unnecessarily performed when the occupant is not applying makeup.

Further, in the first embodiment, the processing unit 82 performs a process of closing the lid 68 of the mirror 66 provided on the sun visor 64 of the vehicle as the makeup ending process. Thereby, it is possible to inhibit the occupant from continuing the makeup using the mirror provided on the sun visor of the vehicle.

Further, in the first embodiment, the prohibition unit 84 prohibits the opening and closing of the lid 68 of the mirror 66 provided on the sun visor 64 of the vehicle when the driving state is manual driving. Thereby, it is possible to suppress the occupant from applying makeup until the driving state is switched to autonomous driving.

Second Embodiment

Next, a second embodiment of the present disclosure will be described. The same parts as those in the first embodiment are designated by the same reference signs, and the description thereof will be omitted.

Figure 5:
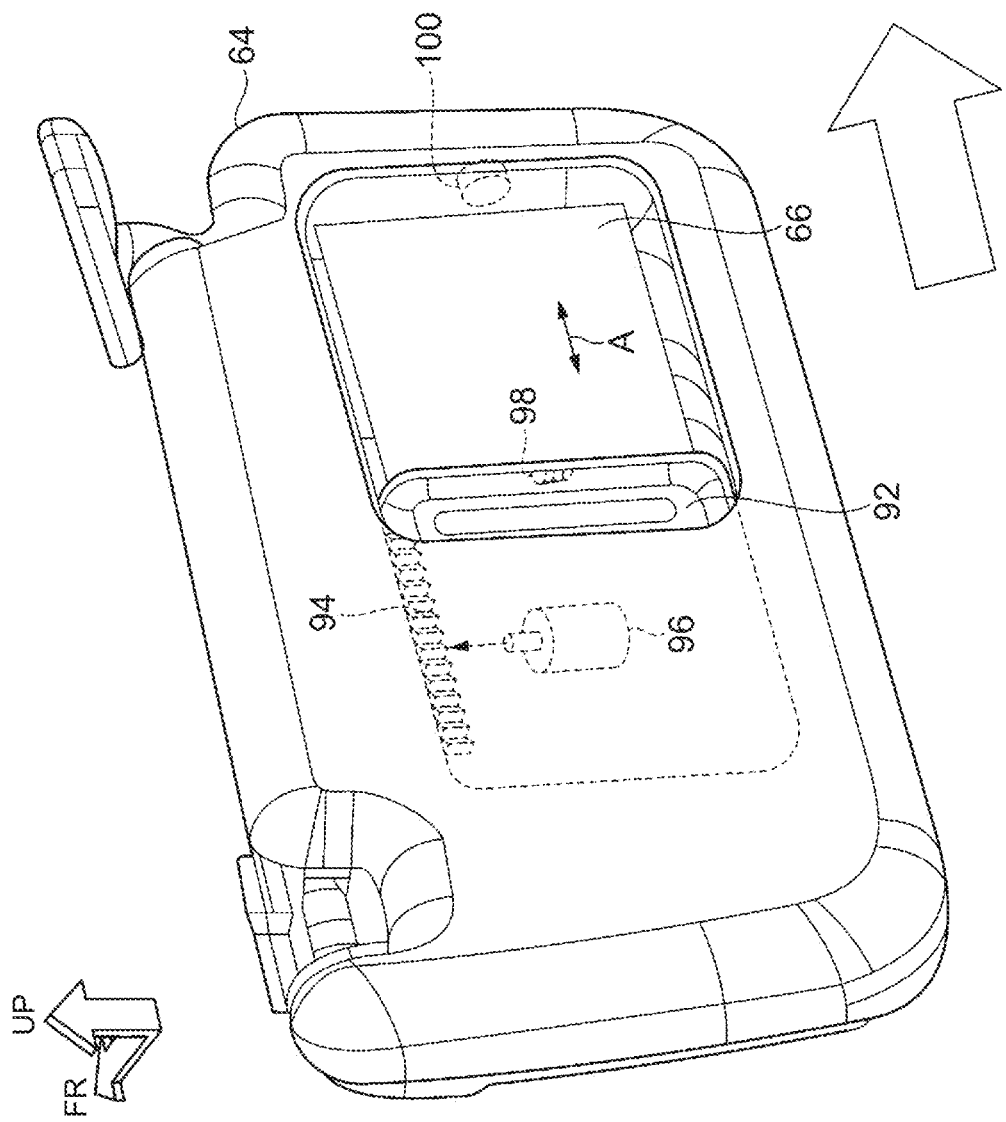
FIG. 5 is a perspective view showing a configuration of a lid opening-closing actuator (ACT) and a lid lock portion according to a second embodiment.

In the first embodiment, the configuration in which the mirror 66 of the sun visor 64 of the own vehicle is provided with the lid 68 that opens and closes the mirror 66 by being pivoted around the shaft 70 has been described, but the present disclosure is not limited to this configuration, and the configuration shown in FIG. 5 may be used. As shown in FIG. 5, the sun visor 64 according to the second embodiment is provided with a lid 92 that opens and closes the mirror 66 by being slid along the arrow A in FIG. 5.

The lid opening-closing ACT 58 includes a rack 94 provided on the side portion of the lid 92 and a motor 96 that rotates a pinion gear (not shown) that meshes with the rack 94 via a reduction mechanism (not shown) with a generated driving force. The lid opening-closing ACT 58 slides the lid 92 with the driving force of the motor 96 to open and close the mirror 66.

Further, the lid lock portion 60 includes a metal member 98 provided at the leading end portion of the lid 92 when the lid 92 is slid in the direction of closing the mirror 66, and an electromagnet 100 that is disposed at a position to face the metal member 98 with the lid 92 being closed. In the lid lock portion 60, the metal member 98 is attracted by the electromagnet 100 with the mirror 66 being closed with the lid 92, which prohibits the lid 92 from opening (the mirror 66 from being exposed) and locks the lid 92 with the lid 92 being closed.

Since the second embodiment is the same as the first embodiment except for the configurations of the sun visor 64, the lid opening-closing ACT 58, and the lid lock portion 60, the description of operations and effects will be omitted.

Third Embodiment

Next, a third embodiment of the present disclosure will be described. The same parts as those in the first embodiment are designated by the same reference signs, and the description thereof will be omitted.

Figure 6:
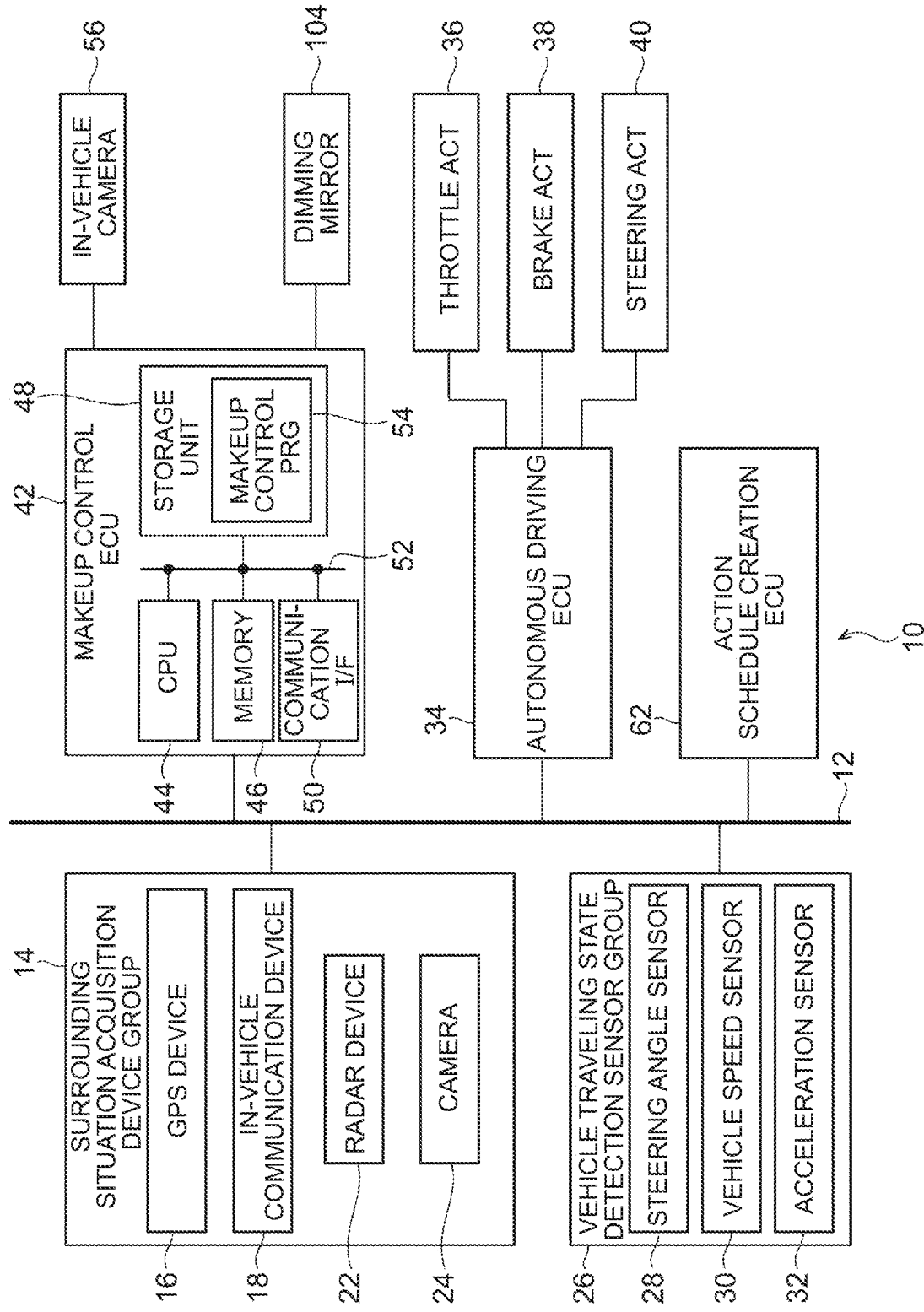
FIG. 6 is a block diagram showing a schematic configuration of an in-vehicle system according to a third embodiment.
Figure 7:
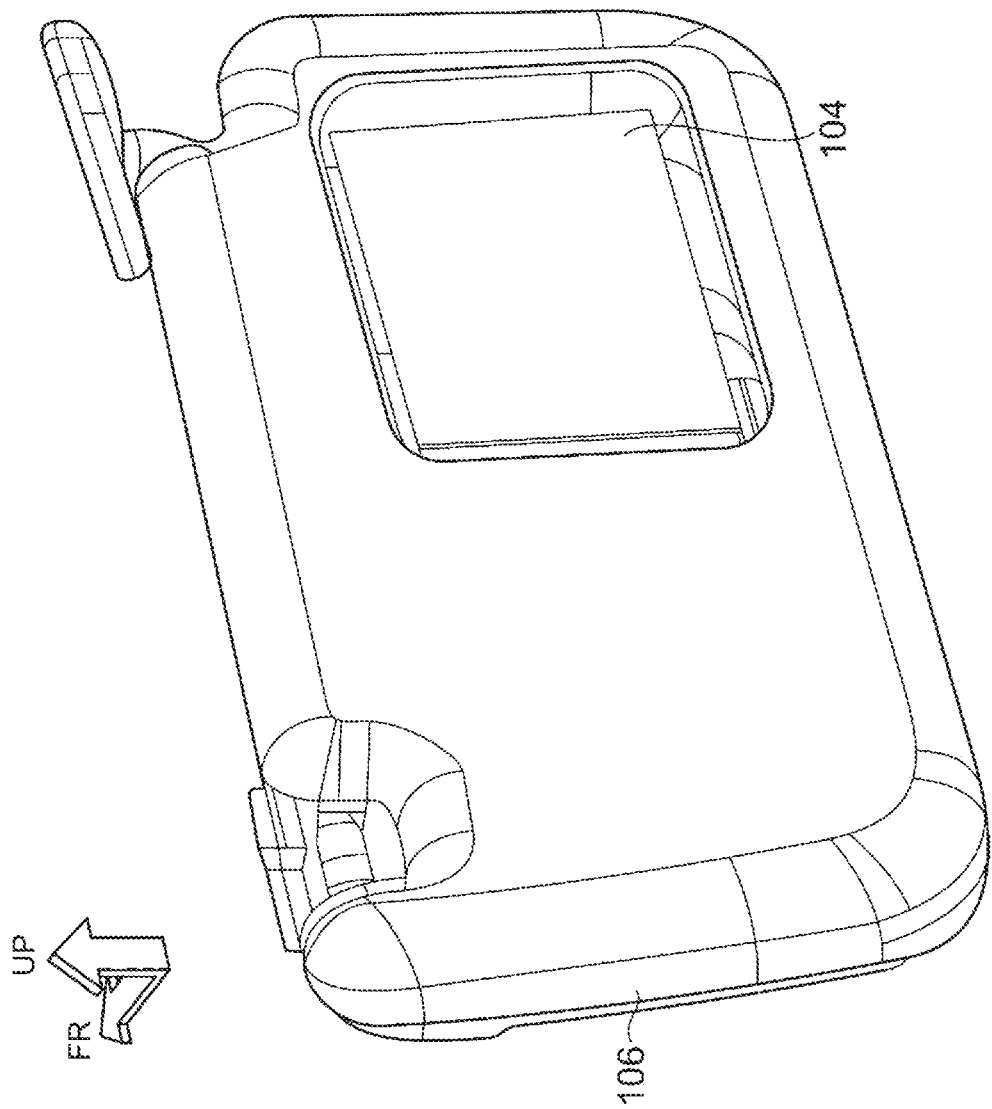
FIG. 7 is a perspective view showing a sun visor according to the third embodiment.

As shown in FIG. 6, in the third embodiment, the lid opening-closing ACT 58 and the lid lock portion 60 are omitted, and a dimming mirror 104 (see also FIG. 7) is provided instead. The dimming mirror 104 can be electrically switched between a mirror state in which the light reflectance is equal to or higher than a predetermined value and a transmission state in which the light reflectance is lower than the predetermined value, and is provided on the sun visor 64 in place of the mirror (optical mirror) 66 described in the first embodiment. The dimming mirror 104 is connected to the makeup control ECU 42, and the makeup control ECU 42 switches the dimming mirror 104 to the mirror state or the transmission state.

Figure 8:
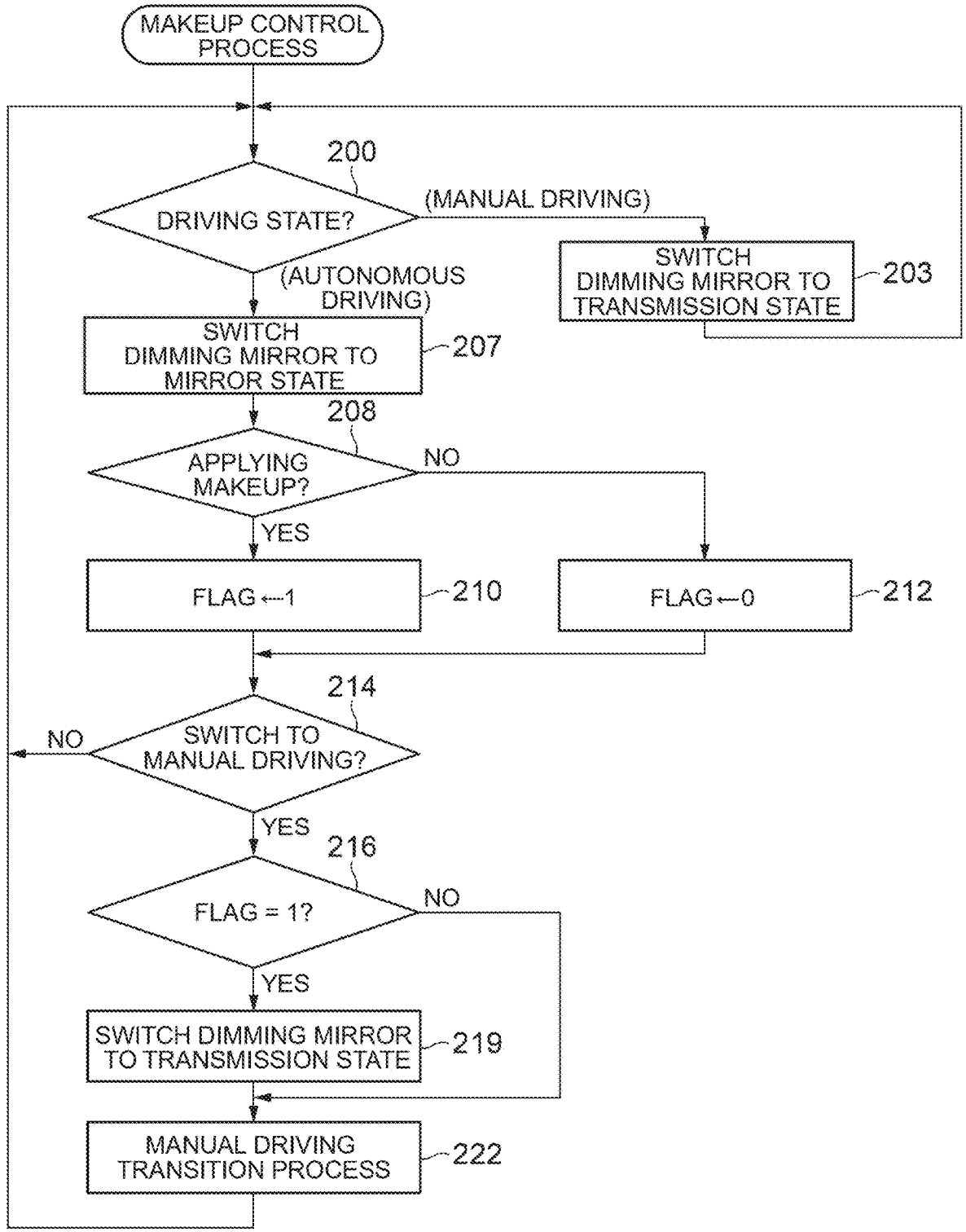
FIG. 8 is a flowchart showing an example of a makeup control process according to the third embodiment.

Next, with reference to FIG. 8, the makeup control process according to the third embodiment will be described focusing on the part different from the makeup control process (FIG. 4) described in the first embodiment. In the makeup control process according to the third embodiment, when the driving state of the own vehicle is manual driving, the process proceeds from step 200 to step 203, and in step 203, the prohibition unit 84 switches the dimming mirror 104 to the transmission state. Thereby, while the driving state of the own vehicle is manual driving, the mirror image of the occupant is not displayed on the dimming mirror 104, so that the occupant is prohibited from applying makeup using the dimming mirror 104 of the sun visor 64.

When the driving state of the own vehicle is autonomous driving, the process proceeds from step 200 to step 207, and the processing unit 82 switches the dimming mirror 104 to the mirror state. Thereby, while the driving state of the own vehicle is autonomous driving, the mirror image of the occupant is displayed on the dimming mirror 104, so that the occupant can apply makeup using the dimming mirror 104 of the sun visor 64.

Further, when the timing for switching the driving state from autonomous driving to manual driving arrives (affirmative in step 214) and the occupant continues applying makeup (affirmative in step 216), the process proceeds to step 219. In step 219, the processing unit 82 switches the dimming mirror 104 to the transmission state. Thereby, the mirror image of the occupant is not displayed on the dimming mirror 104, so that the occupant is inhibited from continuing the makeup using the dimming mirror 104 of the sun visor 64. Note that step 219 is an example of the makeup ending process.

As described above, in the third embodiment, the processing unit 82 performs a process of erasing the mirror image displayed on the dimming mirror 104 provided on the sun visor 64 of the own vehicle as the makeup ending process. Thereby, it is possible to inhibit the occupant from continuing the makeup by looking at the mirror image displayed on the dimming mirror 104 provided on the sun visor 64 of the own vehicle.

Further, in the third embodiment, the prohibition unit 84 prohibits display of the mirror image on the dimming mirror 104 provided on the sun visor 64 of the own vehicle when the driving state is manual driving. Thereby, it is possible to suppress the occupant from applying makeup until the driving state is switched to autonomous driving.

Fourth Embodiment

Next, a fourth embodiment of the present disclosure will be described. The same parts as those in the first embodiment are designated by the same reference signs, and the description thereof will be omitted.

Figure 9:
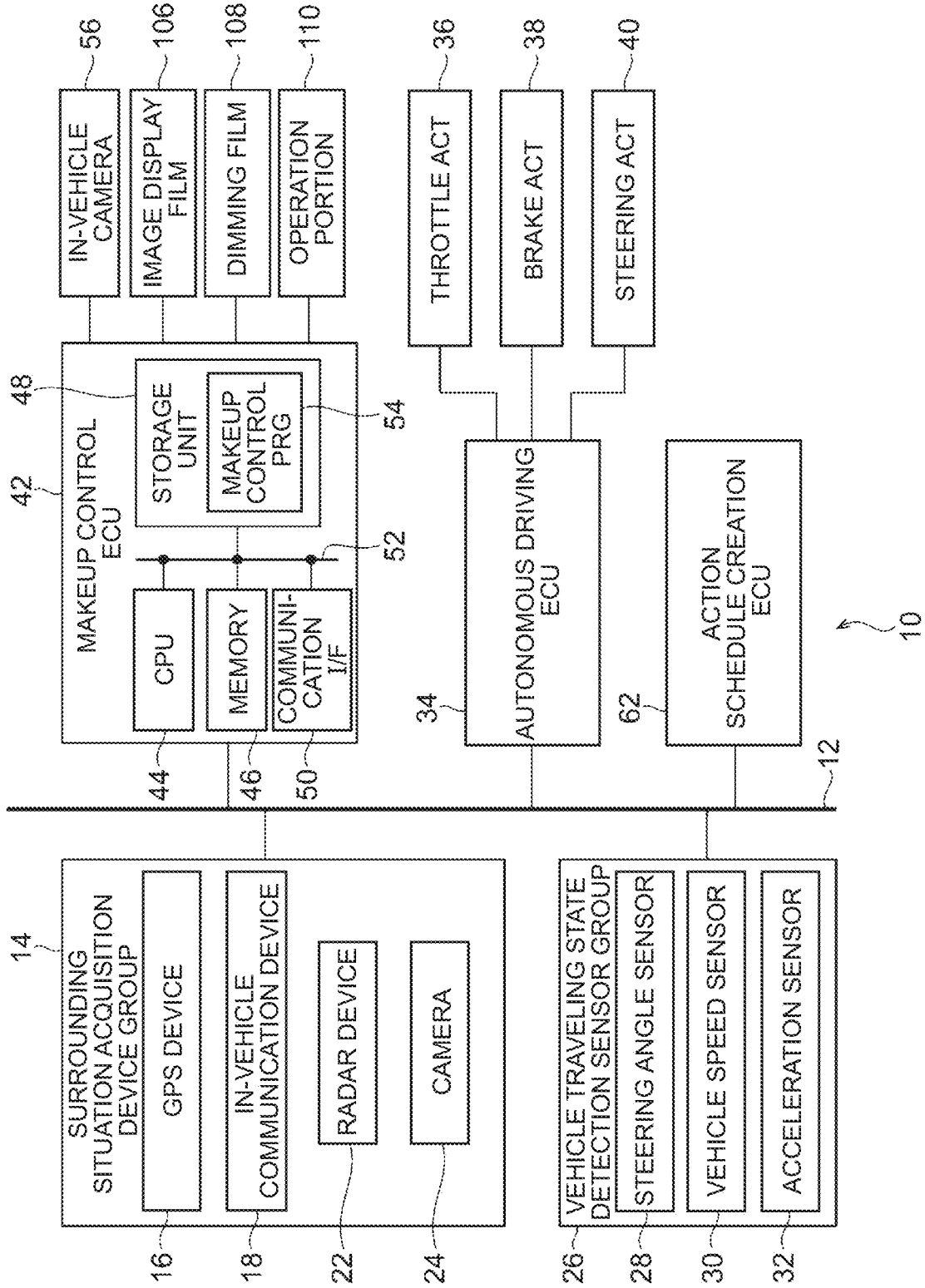
FIG. 9 is a block diagram showing a schematic configuration of an in-vehicle system according to a fourth embodiment.

As shown in FIG. 9, in the fourth embodiment, the lid opening-closing ACT 58 and the lid lock portion 60 are omitted, and an image display film 106, a dimming film 108, and an operation portion 110 are provided instead. The image display film 106, the dimming film 108, and the operation portion 110 are connected to the makeup control ECU 42.

As shown in FIG. 10, the windshield glass 112 is disposed on the front side of the vehicle cabin of the own vehicle in the vehicle front-rear direction. The windshield glass 112 is made of a transparent glass plate, extends downward toward the front in the vehicle front-rear direction from the peripheral edge portion of the roof portion on the front side in the vehicle front-rear direction when viewed in the vehicle width direction, and curves such that the central portion thereof bulges forward in the vehicle front-rear direction.

The dimming film 108 is attached along the entire surface of the windshield glass 112 on the vehicle cabin side. The transmittance of the dimming film 108 can be adjusted by adjusting the magnitude of the applied voltage with the makeup control ECU 42.

The image display film 106 is made of an organic electroluminescence (EL) display or the like, and is attached along the entire surface of the dimming film 108 on the vehicle cabin side. The image display film 106 is of a transparent type, and can display various images by being driven by signals output from the makeup control ECU 42.

Further, the in-vehicle camera 56 is provided near the boundary between the windshield glass 112 and the roof portion of the vehicle, and is capable of acquiring an image of the occupant's face. The image data acquired by the in-vehicle camera 56 is transmitted to the makeup control ECU 42, and the makeup control ECU 42 detects the direction of line-of-sight of the occupant from the image data.

The windshield glass 112 curves as described above and inclines with respect to the line of sight of the occupant. Thus, when the image of the occupant's face taken by the in-vehicle camera 56 is directly mirrored and displayed on the image display film 106, the mirror image seen by the occupant becomes distorted.

Therefore, the makeup control ECU 42 corrects the mirror image displayed on the image display film 106 such that the mirror image of the entire face of the occupant is displayed in front of the occupant in an upright state with respect to the occupant, based on the detected direction of line-of-sight of the occupant.

The operation portion 110 includes a push switch provided on the instrument panel. The push switch is pressed by the occupant for activating the makeup mode for displaying a mirror image of the occupant's face on the image display film 106 and for ending the makeup mode. However, when the driving state of the own vehicle is manual driving, the makeup mode is inhibited from being activated even if the push switch of the operation portion 110 is pressed.

Figure 11:
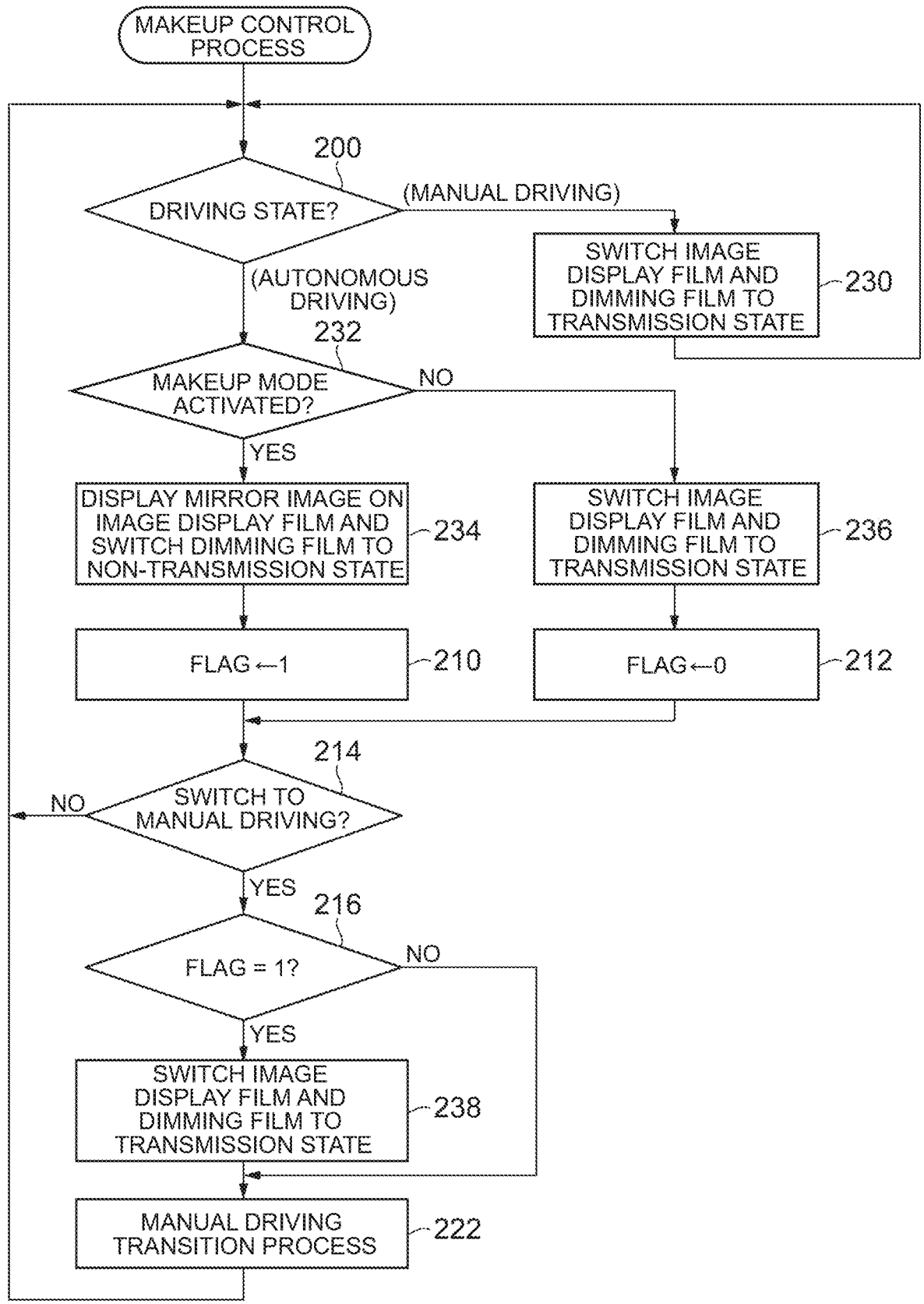
FIG. 11 is a flowchart showing an example of a makeup control process according to the fourth embodiment.

Next, with reference to FIG. 11, the makeup control process according to the fourth embodiment will be described focusing on the part different from the makeup control process (FIG. 4) described in the first embodiment.

In the makeup control process according to the fourth embodiment, when the driving state of the own vehicle is manual driving, the process proceeds from step 200 to step 230, and in step 230, the prohibition unit 84 switches the image display film 106 and the dimming film 108 to the transmission state (transparent state). Thereby, while the driving state of the own vehicle is manual driving, the mirror image of the occupant is not displayed on the image display film 106, so that the occupant is prohibited from applying makeup using the mirror image of the occupant's face displayed on the image display film 106.

Further, when the driving state of the own vehicle is autonomous driving, the process proceeds from step 200 to step 232, and in step 232, it is determined whether the makeup mode is activated by pressing the push switch of the operation portion 110. When the determination in step 232 is affirmative, the process proceeds to step 234. In step 234, the processing unit 82 displays a mirror image of the occupant's face on the image display film 106, and switches the dimming film 108 to a non-transmission state (non-transparent state), whereby the windshield glass 112 is shielded by the dimming film 108. Thereby, the occupant can apply makeup using the mirror image of the occupant's face displayed on the image display film 106. Further, in step 210, the processing unit 82 sets the flag to 1.

On the other hand, when the makeup mode is not activated, the determination in step 232 is negative and the process proceeds to step 236. In step 236, the processing unit 82 switches the image display film 106 and the dimming film 108 to the transmission state (transparent state). Further, in step 210, the processing unit 82 sets the flag to 0.

Further, when the timing for switching the driving state from autonomous driving to manual driving arrives (affirmative in step 214) and the occupant continues applying makeup (affirmative in step 216), the process proceeds to step 238. In step 238, the processing unit 82 switches the image display film 106 and the dimming film 108 to the transmission state (transparent state). Thereby, the mirror image of the occupant's face is not displayed on the image display film 106, and the occupant is inhibited from continuing the makeup using the mirror image of the occupant's face displayed on the image display film 106. Note that step 238 is an example of the makeup ending process.

As described above, in the fourth embodiment, the processing unit 82 performs a process of erasing the mirror image displayed on the windshield glass 112 (image display film 106 provided thereon) of the own vehicle as the makeup ending process. Thereby, it is possible to inhibit the occupant from continuing the makeup by looking at the mirror image displayed on the windshield glass 112 (image display film 106 provided thereon) of the own vehicle.

Further, in the fourth embodiment, the prohibition unit 84 prohibits the display of the mirror image on the windshield glass 112 (image display film 106 provided thereon) of the own vehicle when the driving state is manual driving. Thereby, it is possible to suppress the occupant from applying makeup until the driving state is switched to autonomous driving.

Fifth Embodiment

Next, a fifth embodiment of the present disclosure will be described. The same parts as those in the third embodiment are designated by the same reference signs, and the description thereof will be omitted.

Figure 12:
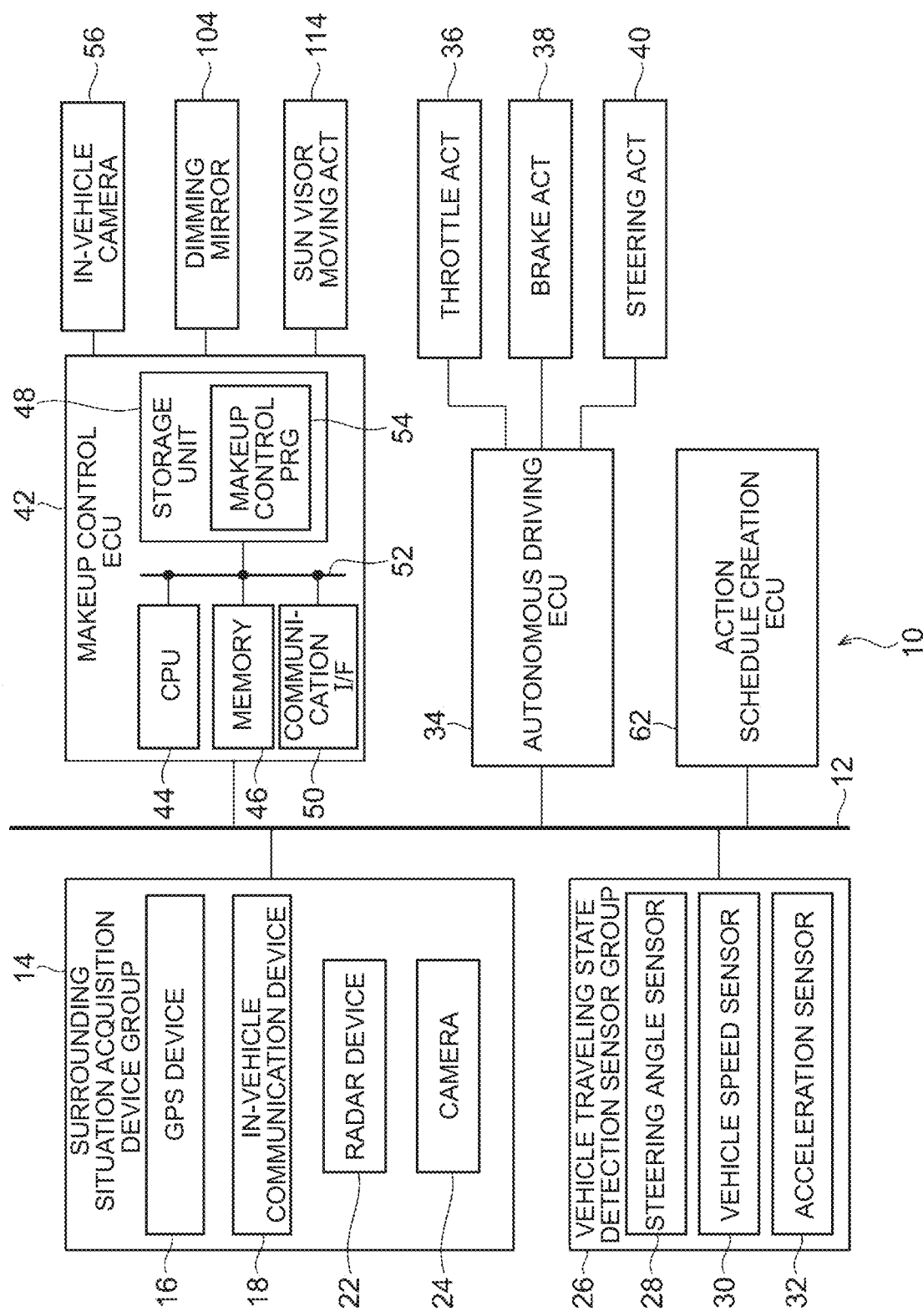
FIG. 12 is a block diagram showing a schematic configuration of an in-vehicle system according to a fifth embodiment.
Figure 13:
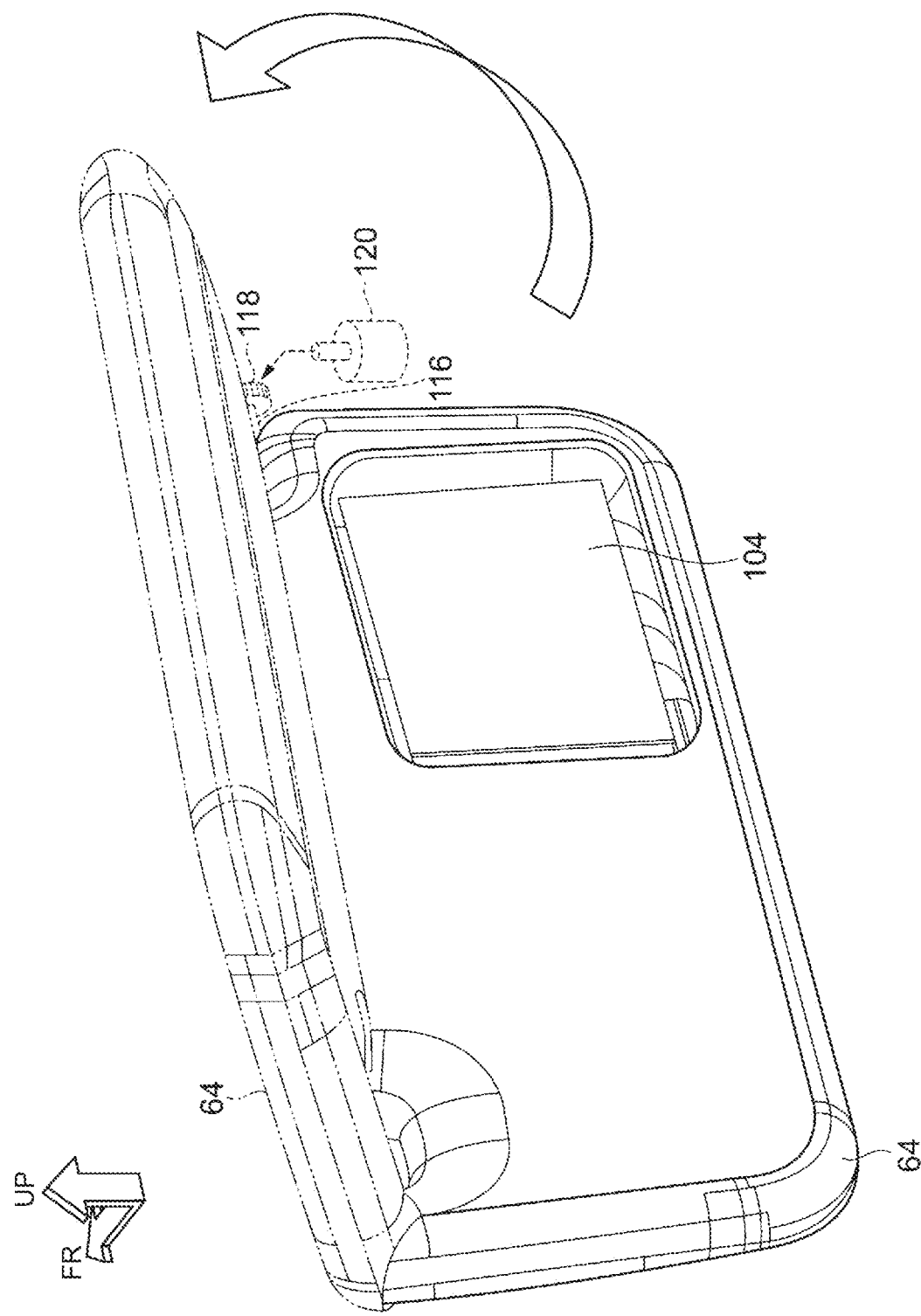
FIG. 13 is a perspective view showing a sun visor according to the fifth embodiment.

As shown in FIG. 12, a sun visor moving ACT 114 is provided in the fifth embodiment. In the sun visor 64 according to the fifth embodiment, the position shown by the long dashed double-short dashed lines in FIG. 13 is a storage position, and in this storage position, the dimming mirror 104 is located on the back side of the sun visor 64 as viewed from the occupant, and concealed by sun visor 64. The sun visor 64 is pivoted about a shaft 116 from the storage position to an in-use position shown by the solid lines in FIG. 13, so that the dimming mirror 104 is exposed, which makes it possible to apply makeup using the dimming mirror 104 provided on the sun visor 64. In addition, the sun visor 64 in the in-use position can block the sunlight that enters the eyes of the occupant.

The sun visor moving ACT 114 includes a gear 118 attached to the shaft 70 of the sun visor 64, and a motor 120 that rotates the gear 118 by a generated driving force via a reduction mechanism (not shown). The sun visor 64 is pivoted to the storage position or the in-use position by the driving force of the motor 120. The operation of the sun visor moving ACT 114 is controlled by the makeup control ECU 42.

Figure 14:
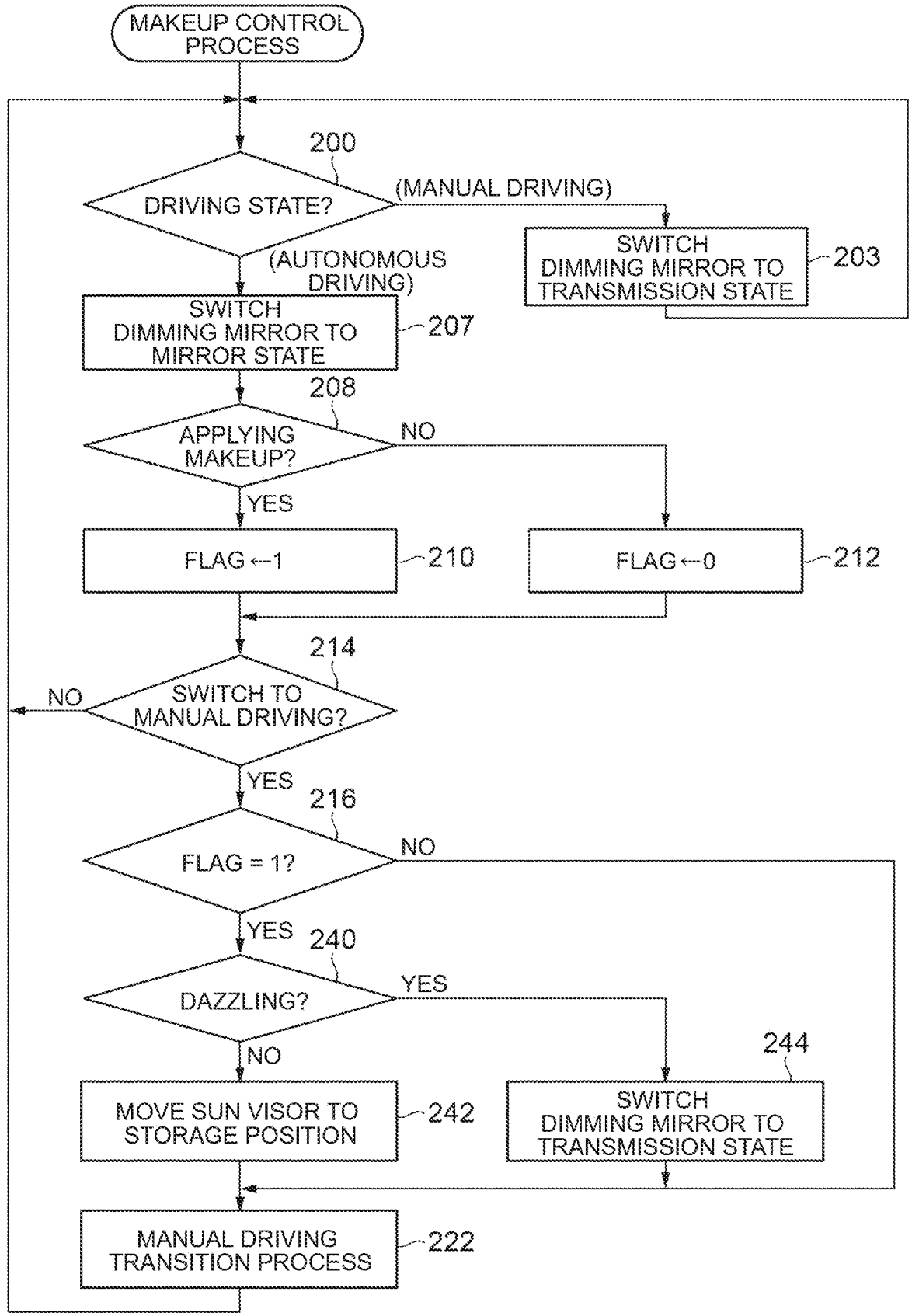
FIG. 14 is a flowchart showing an example of a makeup control process according to the fifth embodiment.

Next, with reference to FIG. 14, the makeup control process according to the fifth embodiment will be described focusing on the part different from the makeup control process (FIG. 8) described in the third embodiment. In the makeup control process according to the fifth embodiment, when the timing for switching the driving state from autonomous driving to manual driving arrives (affirmative in step 214) and the occupant continues applying makeup (affirmative in step 216), the process proceeds to step 240. At this time, the sun visor 64 is located in the in-use position.

In step 240, the processing unit 82 determines whether the occupant feels dazzled when the sun visor 64 is returned to the storage position. The determination in step 240 can be realized by, for example, providing a solar radiation sensor on the back surface of the sun visor 64 (the surface opposite to the surface on which the dimming mirror 104 is provided) and determining whether the amount of solar radiation detected by the solar radiation sensor is equal to or larger than a predetermined value.

When the determination in step 240 is negative, the process proceeds to step 242. In step 242, the processing unit 82 pivots the sun visor 64 from the in-use position to the storage position with the sun visor moving ACT 114. Thereby, the dimming mirror 104 is concealed behind the sun visor 64 as viewed from the occupant, so that the occupant is inhibited from continuing the makeup using the dimming mirror 104 of the sun visor 64.

When the determination in step 240 is affirmative, the process proceeds to step 244. In step 244, the processing unit 82 switches the dimming mirror 104 to the transmission state. Thereby, the mirror image of the occupant is not displayed on the dimming mirror 104, so that the occupant is inhibited from continuing the makeup using the dimming mirror 104 of the sun visor 64. Further, by pivoting the sun visor 64 to the storage position, it is possible to suppress the occupant from feeling dazzled. The steps 242, 244 are examples of the makeup ending process.

As described above, in the fifth embodiment, the processing unit 82 performs a process of returning, to the storage position, the sun visor 64 moved from the storage position and used by the occupant, as the makeup ending process. Thereby, it is possible to inhibit the occupant from continuing the makeup using the sun visor 64 moved from the storage position.

Sixth Embodiment

Next, a sixth embodiment of the present disclosure will be described. The same parts as those in the fifth embodiment are designated by the same reference signs, and the description thereof will be omitted.

Figure 15:
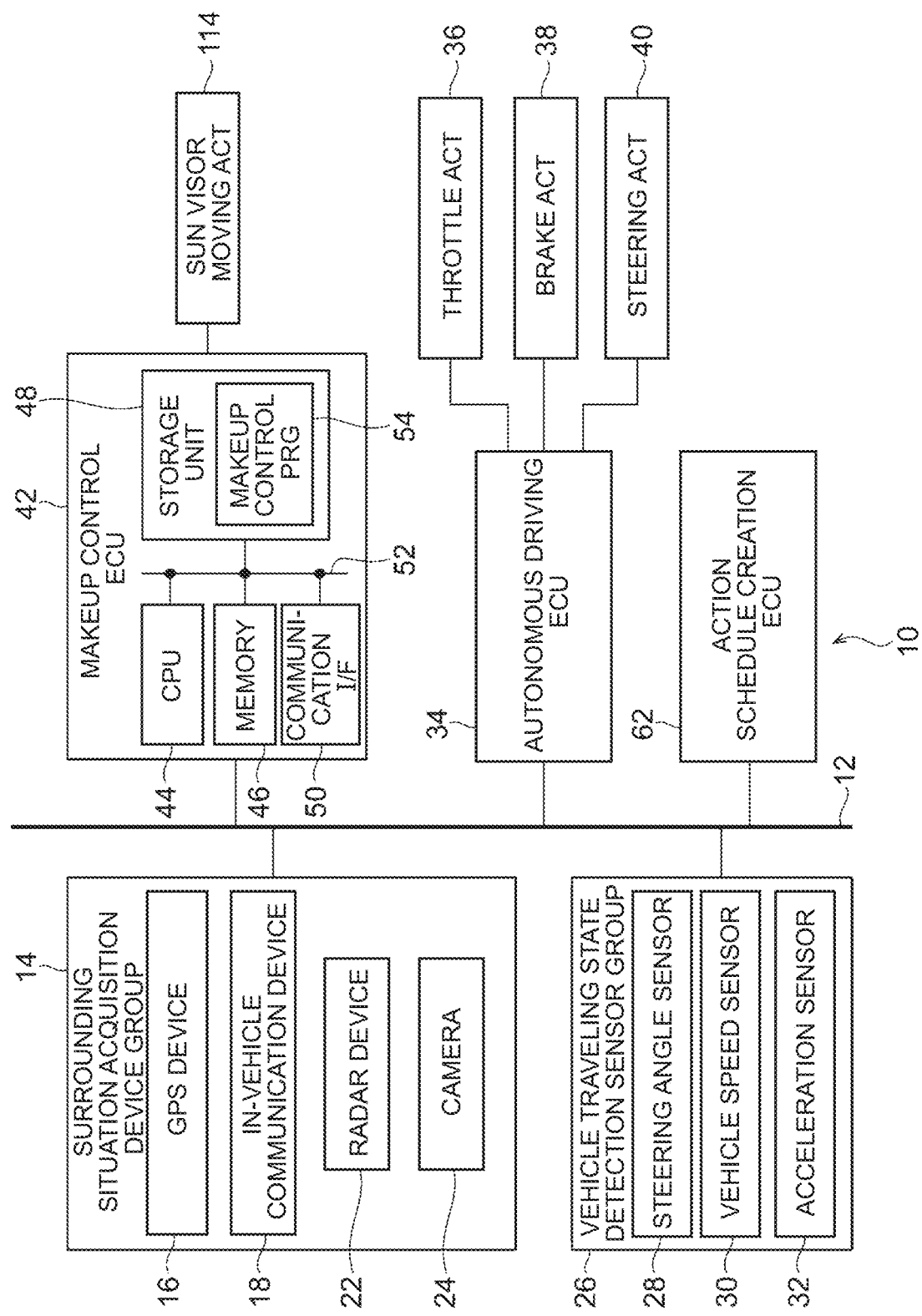
FIG. 15 is a block diagram showing a schematic configuration of an in-vehicle system according to a sixth embodiment.
Figure 16:
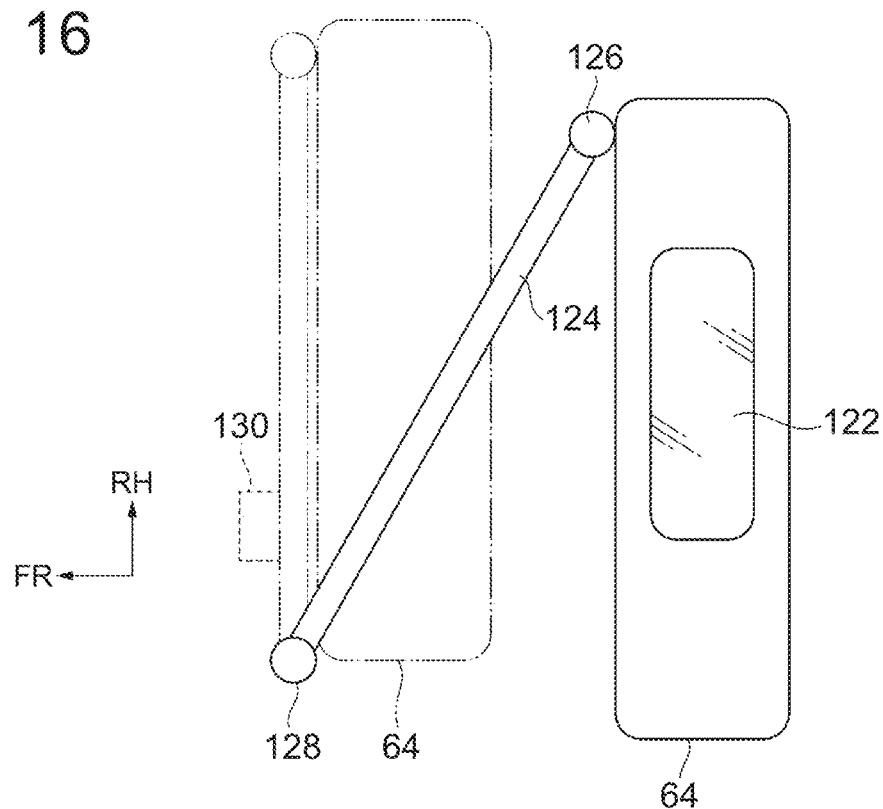
FIG. 16 is a plan view showing a sun visor according to the sixth embodiment.

As shown in FIG. 15, the in-vehicle camera 56 and the dimming mirror 104 are omitted in the sixth embodiment. As shown in FIG. 16, the sun visor 64 according to the sixth embodiment is provided with an optical mirror 122, and one end of a rod 124 is connected to one end portion via a connecting portion 126. The other end of the rod 124 is connected to the roof portion of the own vehicle via a connecting portion 128. The connecting portions 126, 128 are composed of, for example, universal joints.

The position shown by the long dashed double-short dashed lines in FIG. 16 is the normal position of the sun visor 64. The sun visor 64 is pulled out from the normal position to the in-use position shown by the solid lines in FIG. 16 toward the rear of the vehicle, so that the distance between the mirror 122 and the occupant becomes an appropriate distance for applying makeup using the mirror 122, which makes it possible to apply makeup using the mirror 122.

In the sixth embodiment, the sun visor moving ACT 114 includes an electromagnet 130 that generates a magnetic force that attracts the rod 124. When the rod 124 is attracted by the electromagnet 130, the sun visor 64 pulled out to the in-use position is moved to the normal position. The operation of the sun visor moving ACT 114 is controlled by the makeup control ECU 42.

Figure 17:
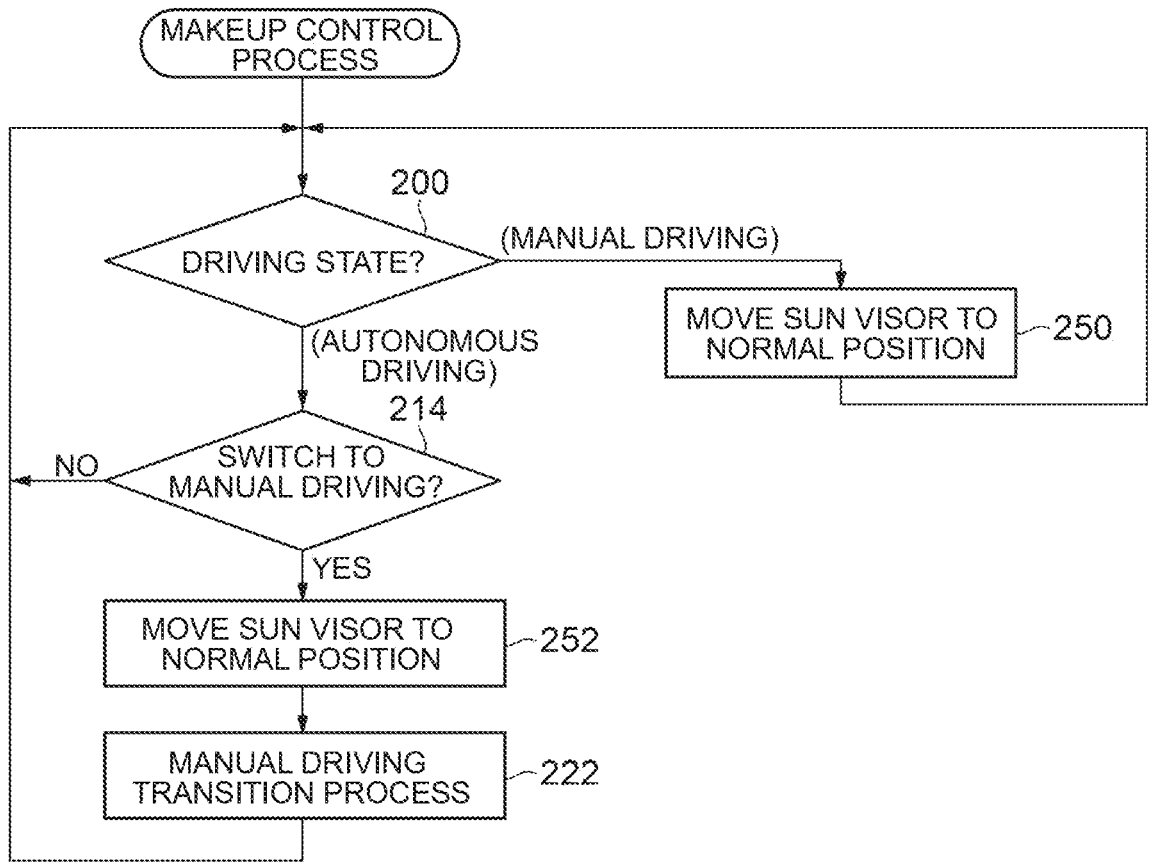
FIG. 17 is a flowchart showing an example of a makeup control process according to the sixth embodiment.

Next, the makeup control process according to the sixth embodiment will be described with reference to FIG. 17. When the driving state of the own vehicle is manual driving, the process proceeds from step 200 to step 250, and in step 250, the prohibition unit 84 moves the sun visor 64 to the normal position with the sun visor moving ACT 114. Thereby, while the driving state of the own vehicle is manual driving, the sun visor 64 is located at a position away from the occupant, so that the occupant is prohibited from applying makeup using the mirror image of the occupant displayed on the mirror 122.

When the driving state of the own vehicle is autonomous driving, the process proceeds from step 200 to step 214, and in step 214, the processing unit 82 determines whether the timing for switching the driving state from autonomous driving to manual driving has arrived. When the determination in step 214 is negative, the process returns to step 200, and steps 200, 214 are repeated until the determination in step 214 becomes affirmative. During this time, the occupant can pull out the sun visor 64 to the in-use position and apply makeup using the mirror image of the occupant displayed on the mirror 122.

When the determination in step 214 is affirmative, the process proceeds to step 252. In step 252, the processing unit 82 moves the sun visor 64 to the normal position with the sun visor moving ACT 114. Thus, when the occupant is applying makeup, the occupant is inhibited from continuing the makeup using the mirror 122 of the sun visor 64.

As described above, in the sixth embodiment, it is not determined whether the occupant is applying makeup while the driving state of the own vehicle is autonomous driving, but the first aspect includes the above-described aspect.

In the sixth embodiment, the processing unit 82 performs a process of returning, to the normal position, the sun visor 64 pulled from the normal position toward the rear of the vehicle and used by the occupant, as the makeup ending process. Thereby, it is possible to inhibit the occupant from continuing the makeup using the sun visor 64 pulled toward the rear of the vehicle from the normal position.

The makeup ending process is not limited to the process described in each of the above embodiments. For example, when the driving state of the own vehicle is switched from autonomous driving to manual driving, a warning may be issued if the occupant continues applying the makeup.

What is claimed is:

1. A vehicle control device, comprising:
   a memory; and
   a central processing unit (CPU) configured to execute a makeup control program in the memory to perform a makeup control process, the makeup control process including a makeup ending process of ending makeup by an occupant at a time of switching of a driving state from autonomous driving to manual driving in a vehicle in which the driving state is switchable between the autonomous driving and the manual driving, wherein
   the CPU is configured to
      determine whether the occupant is applying makeup in the vehicle in which the driving state is switchable between the autonomous driving and the manual driving, and
      perform the makeup ending process in response to determining that the occupant is applying makeup at the time of switching of the driving state from the autonomous driving to the manual driving.

2. The vehicle control device according to claim 1, wherein the CPU is configured to perform a process of closing a lid of a mirror provided on a sun visor of the vehicle as the makeup ending process.

3. The vehicle control device according to claim 1, wherein the CPU is configured to perform, as the makeup ending process, a process of erasing a mirror image displayed on (i) a mirror provided on a sun visor of the vehicle or (ii) a windshield glass of the vehicle.

4. The vehicle control device according to claim 1, wherein
   the CPU is configured to perform, as the makeup ending process,
      a first process of returning a sun visor pulled from a normal position toward a rear of the vehicle and used by the occupant to the normal position, or
      a second process of returning the sun visor moved from a storage position and used by the occupant to the storage position.

5. The vehicle control device according to claim 1, wherein
   the CPU is configured to, when the driving state of the vehicle is in the manual driving, prohibit
      (i) opening and closing of a lid of a mirror provided on a sun visor of the vehicle, or
      (ii) display of a mirror image on (a) the mirror provided on the sun visor of the vehicle or (b) a windshield glass of the vehicle.

* * * * *